(12) United States Patent
Moore et al.

(10) Patent No.: US 11,005,876 B2
(45) Date of Patent: May 11, 2021

(54) ELASTIC ASSET-BASED LICENSING MODEL FOR USE IN A VULNERABILITY MANAGEMENT SYSTEM

(71) Applicant: Tenable, Inc., Columbia, MD (US)

(72) Inventors: Philippe J. Moore, Roanoke, VA (US); Matthew Nehrbass, Ellicott City, MD (US); Daniel Kahan, Beverly Hills, CA (US)

(73) Assignee: Tenable, Inc., Columbia, MD (US)

( * ) Notice: Subject to any disclaimer, the term of this patent is extended or adjusted under 35 U.S.C. 154(b) by 307 days.

(21) Appl. No.: 15/973,998

(22) Filed: May 8, 2018

(65) Prior Publication Data
US 2018/0332069 A1 Nov. 15, 2018

Related U.S. Application Data

(60) Provisional application No. 62/504,870, filed on May 11, 2017.

(51) Int. Cl.
| | |
|---|---|
| *H04L 29/06* | (2006.01) |
| *G06F 21/10* | (2013.01) |
| *G06F 21/57* | (2013.01) |
| *G06Q 30/06* | (2012.01) |

(52) U.S. Cl.
CPC ........ *H04L 63/1433* (2013.01); *G06F 21/105* (2013.01); *G06F 21/577* (2013.01); *G06Q 30/06* (2013.01)

(58) Field of Classification Search
CPC ... H04L 63/1433; G06Q 30/06; G06F 21/577; G06F 21/105
See application file for complete search history.

(56) References Cited

U.S. PATENT DOCUMENTS

| | | |
|---|---|---|
| 8,650,055 B2 | 2/2014 | Davie |
| 2002/0095514 A1* | 7/2002 | Cromer ............ H04L 29/12811 709/245 |
| 2003/0055749 A1 | 3/2003 | Carmody et al. |
| 2003/0233287 A1 | 12/2003 | Sadler et al. |
| 2006/0085350 A1 | 4/2006 | Samayamantry et al. |
| 2007/0118481 A1* | 5/2007 | Bostrom ................ G06Q 30/04 705/59 |

(Continued)

*Primary Examiner* — Robert B Leung
(74) *Attorney, Agent, or Firm* — Muncy, Geissler, Olds & Lowe, P.C.; Daniel Podhajny

(57) ABSTRACT

The disclosure generally relates to a vulnerability management system configured to implement an asset-based identification algorithm to identify, update, and otherwise reconcile assets in a network according to various identification attributes that are ordered on a spectrum from authoritative to speculative based on an ability that each identification attribute has to accurately link a host to a given asset. The identification algorithm may further enable an elastic asset-based licensing approach, wherein each asset that is scanned in a current licensing period consumes a single license and licenses are reclaimed from any old assets that are not scanned in a current licensing period (i.e., the old assets do not count towards a total licensed asset count. Furthermore, asset counts may be allowed to temporarily exceed the total licensed asset count without requiring license upsells, with true-up payments only required if and/or when asset counts reflect general expansion of a customer network.

42 Claims, 9 Drawing Sheets

(56) References Cited

U.S. PATENT DOCUMENTS

| | | |
|---|---|---|
| 2008/0005787 A1 | 1/2008 | Aldred |
| 2008/0028218 A1 | 1/2008 | Simon |
| 2008/0060071 A1* | 3/2008 | Hennan ............... H04L 63/1416 |
| | | 726/22 |
| 2008/0183626 A1 | 7/2008 | Romero et al. |
| 2010/0305989 A1* | 12/2010 | Mu ...................... G06Q 20/382 |
| | | 705/7.28 |
| 2011/0307885 A1 | 12/2011 | Cushion et al. |
| 2013/0262401 A1 | 10/2013 | Bishop et al. |
| 2014/0131434 A1* | 5/2014 | Ozkan .................. G06F 3/0482 |
| | | 235/375 |
| 2015/0237063 A1* | 8/2015 | Cotton .................. G06F 21/577 |
| | | 726/25 |
| 2016/0112457 A1* | 4/2016 | Lietz ...................... H04L 63/20 |
| | | 726/1 |
| 2017/0199990 A1 | 7/2017 | Boudreau et al. |

* cited by examiner

ELASTIC ASSET-BASED LICENSING MODEL FOR USE IN A VULNERABILITY MANAGEMENT SYSTEM

CROSS-REFERENCE TO RELATED APPLICATIONS

The present application claims the benefit of U.S. Provisional Patent Application No. 62/504,870, entitled "TRACKING ASSETS AND LICENSES IN A VULNERABILITY MANAGEMENT SYSTEM," filed May 11, 2017, the contents of which are hereby incorporated by reference in their entirety.

TECHNICAL FIELD

The various aspects and embodiments described herein generally relate to an elastic asset-based licensing model for use in a vulnerability management system.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities. The conventional approach of running periodic scans no longer provides the visibility and insight needed for the dynamic assets used in modern computing environments. Moreover, existing vulnerability management systems tend to take the simplistic approach of charging licenses according to the number of scanned IP addresses. The problem with that approach is that an IP address can no longer be trusted to uniquely identify an asset in modern environments that include virtual infrastructure, mobile laptops, tablets, and phones, and other dynamic assets. For example, the IP address assigned to a given mobile device may change as the mobile device moves from a home office to a corporate office and then to a hotel and so on. Vulnerability scans performed when the mobile device is at these different locations could then potentially identify a single device as three different devices, whereby an IP-based licensing approach could lead to a single asset consuming multiple vulnerability management licenses. Furthermore, problems with IP-based licensing are not limited to mobile and other dynamic assets. For example, many servers have multiple network interfaces that have different IP addresses, such as one for production, one for administration, one for backup, etc.

Accordingly, with the significant change in the way organizations approach assets and vulnerabilities, having a well-managed place for all vulnerability data no matter the source is more critical than ever. Vulnerability management solutions that only accept and manage their own data are therefore doing a disservice to their users. Moreover, IP-based vulnerability tracking is increasingly problematic given that many modern assets have multiple and/or dynamic IP addresses, while an IP address is often irrelevant for other assets such as cloud instances. In situations like these, traditional vulnerability management solutions that rely solely or primarily on IP addresses are likely to provide inaccurate, incomplete, or misleading results because due to redundant counting of vulnerabilities on assets having multiple IP addresses, miscounting on assets like cloud instances that can have short-lived IP addresses, and so on. Given these fundamental shifts in how organizations must address assets and vulnerabilities, a new, modern approach is needed to solve fundamental vulnerability management challenges and provide security professionals with the ability to make better decisions about where to focus resources and priorities to best protect their environments without penalizing customers for embracing new technologies like the cloud, DevOps, and others.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a vulnerability management system as described herein may employ an asset-based approach to track resources and vulnerabilities while also accommodating dynamic assets such as laptops, virtual machines, cloud instances, containers, etc. In various embodiments, the vulnerability management system may include one or more data sensors configured to perform active vulnerability scanning, which may provide broad asset and vulnerability management coverage, as well as agent-based scanning and passive traffic listening, which may advantageously enable functions to manage otherwise troublesome assets such as transient or remote devices and sensitive hosts such as medical or industrial control devices.

According to various aspects, the vulnerability management system may employ an asset identification (or "fingerprinting") algorithm to pinpoint the true identity associated with each resource in a network environment to provide asset-based visibility into the vulnerabilities that may exist within the network environment. In various embodiments, the asset identification algorithm may use various identification attributes that could exist in an incoming host to accurately track assets and changes thereto regardless of how long the assets exist, how the assets roam, etc. For example, in various embodiments, the identification attributes may include a universally unique identifier (UUID), a Media Access Control (MAC), a Network Basic Input/Output System (NetBIOS) name, a Fully-Qualified Domain Name (FQDN), etc., which may be ordered on a spectrum from authoritative to speculative based on an ability that each identification attribute has to link a particular host to an existing asset. As such, the asset identification algorithm may generally attempt to match an incoming scan record to existing asset, wherein the incoming host may be assumed to be a new asset and added as such in the event that an existing asset that matches the incoming scan record cannot be found. Alternatively, when the incoming scan record has been matched to an existing asset, stored information related to the existing asset may be updated to incorporate any new or updated information contained in the incoming scan record.

According to various aspects, the asset identification algorithm mentioned above and described in further detail below may advantageously enable, among other things, an elastic asset-based licensing model. More particularly, under the elastic asset-based licensing model, a single vulnerability management license may be consumed per asset that is scanned within a given time period. For example, the above-mentioned asset identification algorithm may be used to determine what is an asset and to track the number of assets scanned in a current licensing period such that a customer (e.g., an entity that owns a network managed using the vulnerability management system) may be charged according to a licensing structure based on the total number of assets scanned in the current licensing period. Furthermore, as part of the asset tracking process, old assets that have not been scanned within the current licensing period may be decommissioned, in that the old asset(s) may no longer be counted for licensing purposes. However, the customer may still be able to view any vulnerability data related to the decommissioned assets without being charged to do so. Accordingly, the customer may be charged for licenses based on the current state of the network, allowing the customer at least some flexibility to meet needs without being charged for assets that are not in use. In related sense, the elastic licensing model may not have technical limitations that restrict customers from exceeding a total number of licensed assets, in that temporary increases or surges in the number of licensed assets may be flexibly tolerated without requiring the customer to purchase additional licenses. For example, if a given customer has a substantial increase in assets for a short time period within a given licensing period (e.g., a couple days in a quarterly licensing period), the substantial increase may be tolerated without requiring the customer to purchase additional licenses as long as the increase is not indicative of a general expansion in the customer network, in which case the customer may be required to purchase additional licenses based on the number of scanned assets in the expanded network.

According to various aspects, a method for elastic asset-centric vulnerability management may comprise receiving, at a vulnerability management system, a first scan record from one or more vulnerability scanners in communication with a managed network, wherein the first scan record comprises a first set of identification attributes that include at least a first Internet Protocol (IP) address, searching existing asset records in an asset data store based on the first set of identification attributes contained in the first scan record, creating, in the asset data store, an asset record to define a unique electronic object having the first set of identification attributes in response to the existing asset records in the asset data store not including a match for the first scan record, receiving, at the vulnerability management system, a second scan record from the one or more vulnerability scanners, wherein the second scan record comprises a second set of identification attributes that include at least a second IP address, and matching the second scan record to the asset record corresponding to the unique electronic object having the first set of identification attributes based on the second set of identification attributes including at least one value that appears in the first set of identification attributes despite a mismatch between the first and second IP addresses.

According to various aspects, a vulnerability management system may comprise one or more vulnerability scanners in communication with a managed network, a data store comprising one or more storage devices configured to store existing asset records, and one or more processors configured to receive, from the one or more vulnerability scanners, a first scan record that comprises a first set of identification attributes that include at least a first IP address, search the existing asset records in the asset data store based on the first set of identification attributes contained in the first scan record, create, in the asset data store, an asset record to define a unique electronic object having the first set of identification attributes in response to the existing asset records in the asset data store not including a match for the first scan record, receive a second scan record from the one or more vulnerability scanners, wherein the second scan record comprises a second set of identification attributes that include at least a second IP address, and match the second scan record to the asset record corresponding to the unique electronic object having the first set of identification attributes based on the second set of identification attributes including at least one value that appears in the first set of identification attributes despite a mismatch between the first and second IP addresses.

According to various aspects, as will be described in further detail herein, the first and second sets of identification attributes may each include one or more of multiple possible identification attributes that are ordered on a spectrum from authoritative to speculative. As such, the existing asset records in the asset data store may generally be searched according to a descending priority of the multiple possible identification attributes from most authoritative to most speculative (e.g., after one or more unreliable identification attributes have been removed). For example, in various embodiments, each of the multiple possible identification attributes may be ordered on the spectrum from authoritative to speculative based on an authoritative weight that depends on at least a uniqueness property that indicates a probability of different information technology assets sharing the same value for the respective identification attribute. Moreover, in various embodiments, the authoritative weight may further depend on a multiples property that indicates a probability of one information technology asset having multiple valid values for the respective identification attribute.

According to various aspects, as will be described in further detail herein, at least one existing asset record that only matches the first set of identification attributes on a non-unique identification attribute may be identified when the existing asset records are searched. In such a case, the at least one existing asset record may be determined to not be a match for the first scan record in response to the at least one existing asset record and the first set of identification attributes having different values on one or more identification attributes that have a higher authoritative weight than the non-unique identification attribute. In contrast, the asset record associated with the first set of identification attributes may be determined to match the second scan record in response to the first and second sets of identification attributes not having contradictory values on any identification attributes that have a higher authoritative weight than the non-unique identification attribute. Alternatively, a match may be found when an incoming scan record includes one or more identification attributes that match an existing record on an authoritative identification attribute.

According to various aspects, when a match is found between an incoming scan record and an existing asset record, an update procedure may be invoked to reconcile differences (if any) between the identification attributes contained in the incoming scan record and the existing asset record. For example, in various embodiments, the identification attributes contained in the incoming scan record may be compared to the identification attributes contained in the existing asset record to identify one or more identification attributes that have different values. In response to identifying any such attributes, existing values may be replaced with incoming values if the incoming scan record has a more recent scan time than stored in the existing asset record. Otherwise, the existing values may be kept if the incoming scan record has an older scan time than stored in the existing asset record. In one alternative, rather than replacing the existing values, values contained in the incoming scan record may be appended to the existing values if the asset record is determined to correspond to a unique electronic object that is likely to have multiple network interface cards. Furthermore, in various embodiments, when there is at least one identification attribute that does not have a value in the existing asset record and does have a value in the incoming scan record, the value in the incoming scan record may be added to the existing asset record regardless of scan time.

According to various aspects, as mentioned above, the asset identification and updating features described herein may enable a soft or "elastic" asset-based licensing model. For example, in various embodiments, a total number of unique assets sighted in a current licensing period may be determined based at least in part on the existing asset records in the asset data store. As such, a customer that owns the managed network may be charged a software licensing fee based on the total number of unique assets sighted in the current licensing period. In that context, the unique electronic object associated with an asset record that is newly created in the asset data store may be counted among the total number of unique assets sighted in the current licensing period in response to one or more scan records matched to the asset record including information related to one or more vulnerabilities associated with the unique electronic object. However, the unique electronic object may be excluded from the total number of unique assets sighted in the current licensing period if all related scan records include information that is limited to discovery of the unique electronic object. Furthermore, in various embodiments, software licenses may be automatically reclaimed from one or more of the unique assets that have not been sighted within a predefined time period, in which case vulnerability and configuration data associated with the one or more unique assets from which the software licenses are reclaimed may continue to be retained. In various embodiments, in response to a number of unique asset sightings exceeding the total number of unique assets subject to the software licensing fee, the number of unique asset sightings may be permitted to temporarily exceed the total number of unique assets subject to the software licensing fee without requiring the customer to purchase additional software licenses. However, the customer that owns the managed network may later be charged a true-up fee based on the observed number of unique asset sightings if the observed number of unique asset sightings continues to exceed the total number of unique assets subject to the software licensing fee for longer than a threshold duration of time.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
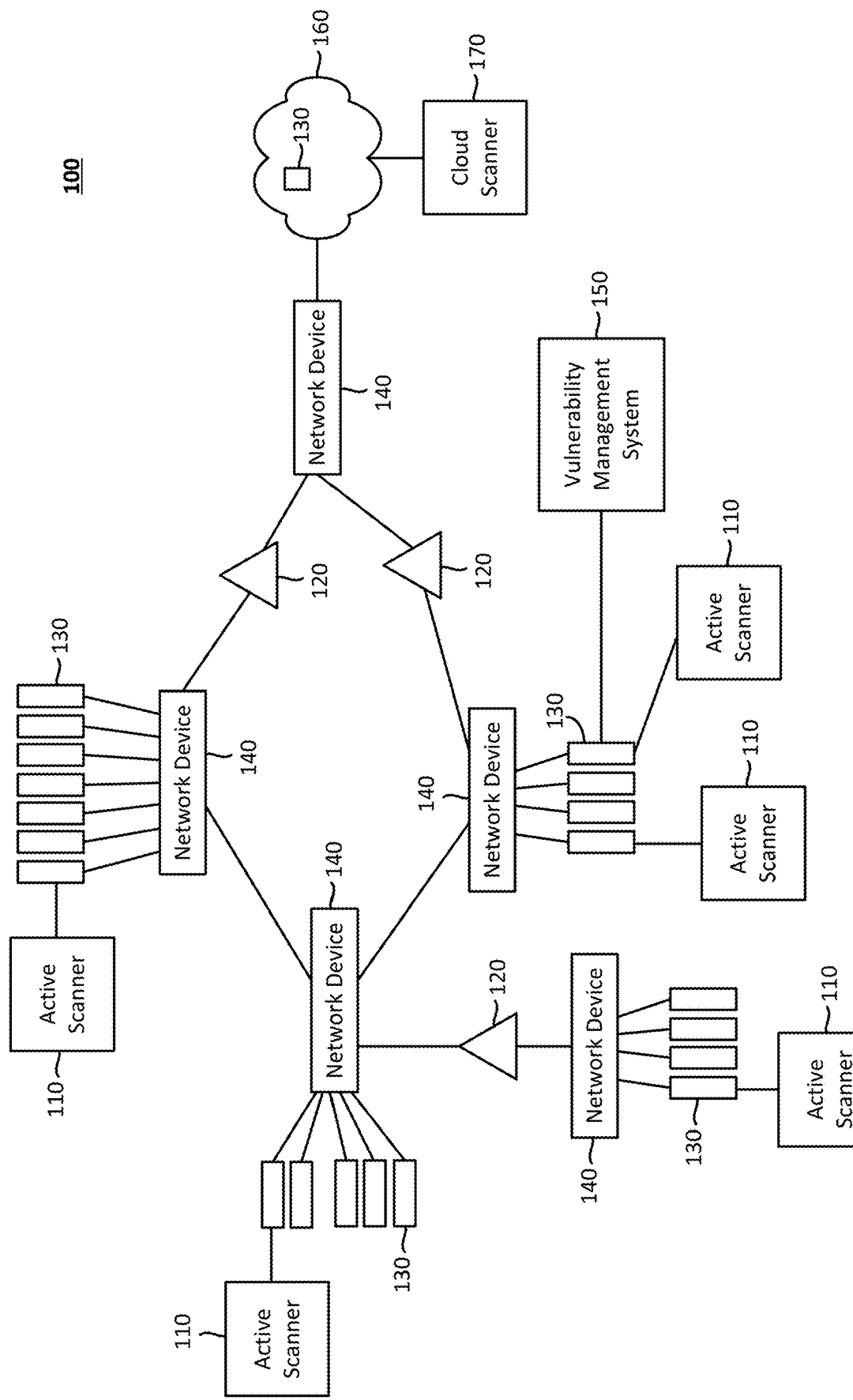
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility. BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
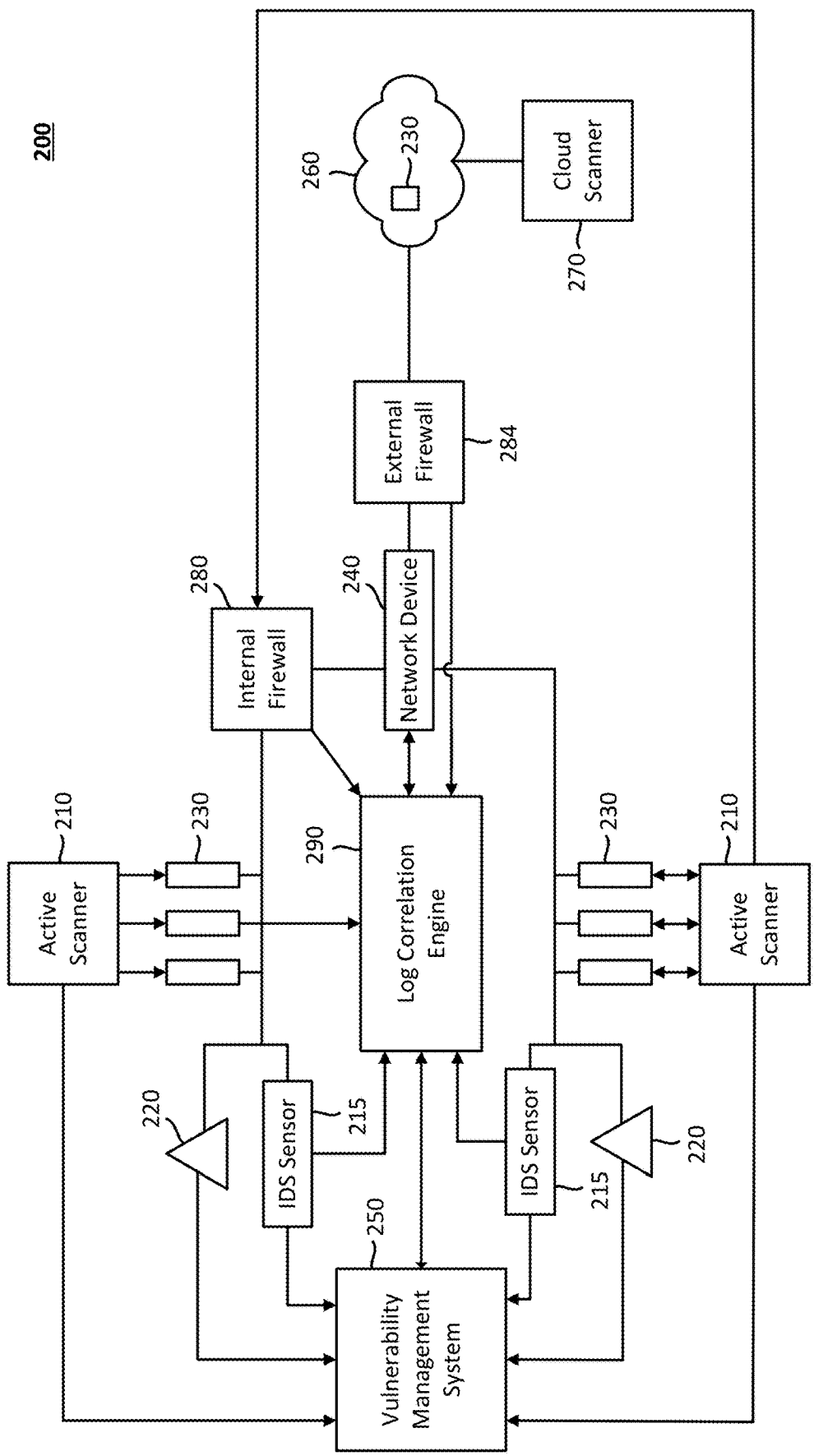
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions. Server Message Block (SMB) sessions, File Transfer Protocol (FTP) sessions, Network File System (NFS) sessions, file access events, file sharing events, or other suitable activity that occurs in the network 20X). In one implementation, the information that the passive scanners 220 obtains from sniffing the traffic traveling across, originating from, or directed to the network 200 may therefore provide a real-time record describing the activity that occurs in the network 20X). Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200( ) to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Furthermore, as described in greater detail below with reference to FIG. 3 through FIG. 9, the vulnerability management systems 150, 250 shown in FIG. 1 and FIG. 2 may implement various algorithms or otherwise have various features and capabilities that may be used to leverage information discovered or otherwise obtained via the active scanners 110, 210, the cloud scanners 170, 270, the passive scanners 120, 220, and the log correlation engine 290 to identify, update, and reconcile assets based on certain identification attributes. These asset identification aspects may further enable an elastic asset-based licensing model whereby a user or customer who owns the managed networks 100, 200 may be charged according to a total number of assets that are scanned within a given licensing period. More particularly, the vulnerability management systems 150, 250 can be provided as a service to the user or customer who owns the networks 100, 200 subject to a software licensing agreement in which the user or customer purchases one or more licenses according to certain pricing terms. In the conventional industry-standard approach, vulnerability management systems tend to charge licenses according to the number of Internet Protocol (IP) addresses or hosts to be scanned. However, the IP or host-based approach is unreliable for various reasons (e.g., the dynamic and elastic nature of the assets that may be present in a modern network, whereby a given asset may have multiple IP addresses and thus be counted multiple times for licensing purposes). Accordingly, the various aspects and embodiments to be described in further detail below may instead charge the user or customer one license per asset on an elastic basis, meaning that licensed asset counts can be temporarily exceeded with true-up payment only required if and/or when scanned assets continue to exceed licensed asset counts such that the excess count indicates that the user or customer network has expanded. Furthermore, under the elastic licensing model described herein, the focus may be on vulnerability management, whereby any tasks that are focused on discovering assets may not be counted for licensing purposes in an effort to encourage users to discover and start to actively manage vulnerabilities on all assets that are present in the managed network.

Figure 3:
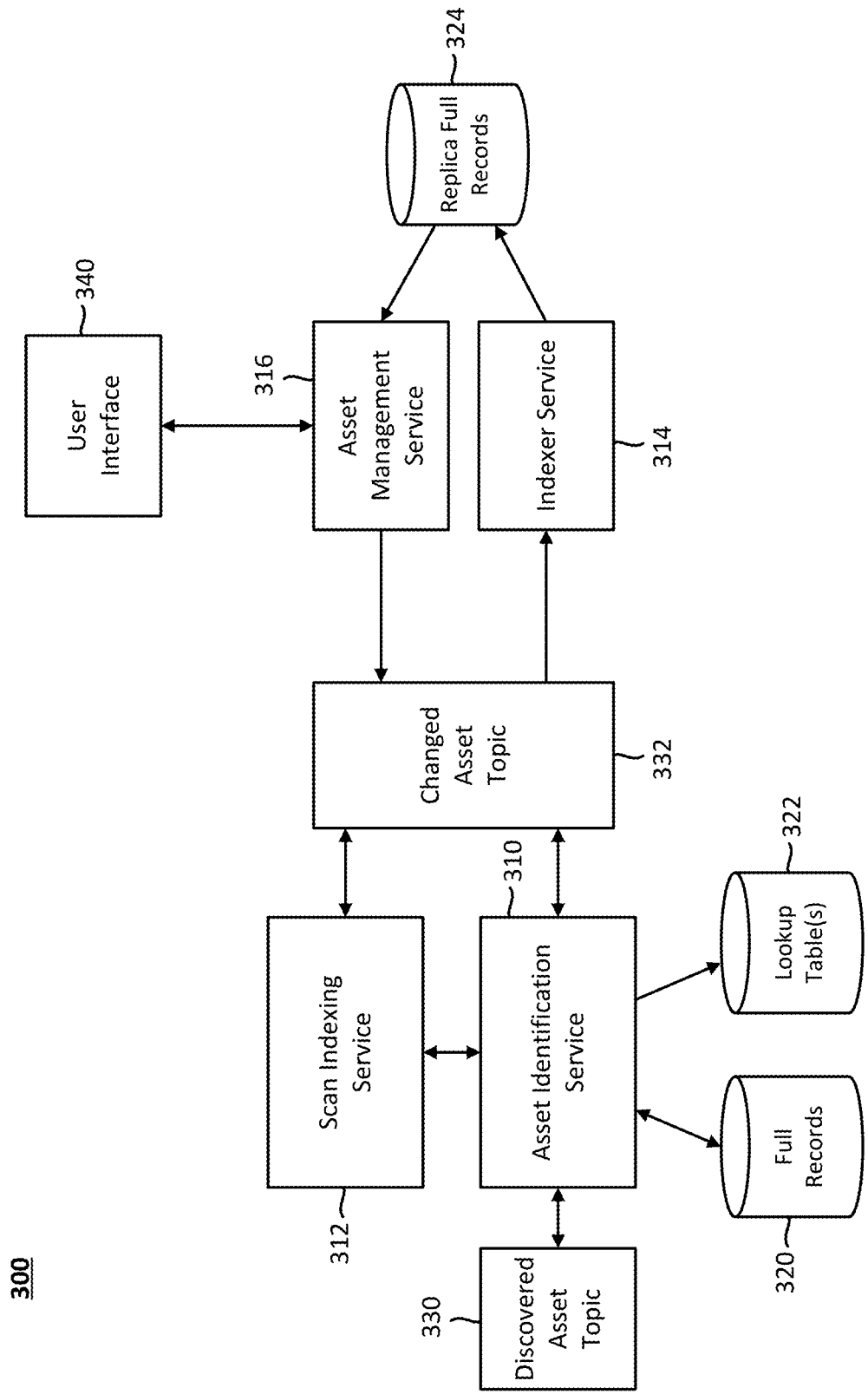
FIG. 3 illustrates an exemplary asset management service level architecture suitable for use in a vulnerability management system, according to various aspects.

According to various aspects, FIG. 3 illustrates an exemplary asset management service level architecture (SLA) 300 suitable for use in a vulnerability management system and for enabling an elastic asset-based licensing structure in which each asset consumes a single license. In particular, as shown in FIG. 3, the asset management SLA 300 may include an asset identification service 310, which may be configured to identify and reconcile assets based on an asset identification algorithm that will be described in further detail below. The asset identification service 310 may be coupled to one or more databases used to store records relating to existing assets that have been discovered in a managed network. In particular, in the example shown in FIG. 3, the asset identification service 310 is coupled to a full records database 320, which may be configured to store a full representation of each asset record. The asset identification service 310 may also be coupled to a scan indexing service 312, which may be configured to create one or more incoming scan records to index information that was obtained in one or more active scans, cloud scans, passive scans, event logs, etc. and to provide the incoming scan records to the asset identification service 310. As such, the full records database 320 may generally be used when the asset identification service 310 needs to determine whether one or more incoming records have new or updated information about a particular asset. The full records database 320 may also be used to restore a replica full records database 324 (or vice versa) in case of record loss. The replica full records database 324 is coupled to a public-facing management service 316 that responds to requests received via a user interface 340 in regards to the assets and to an indexer service 314 used to keep the replica full records database 324 up-to-date.

In various embodiments, in addition to the full records database 320, the asset identification service 310 may be coupled to one or more lookup databases or lookup tables 322 that store information specific to a particular "identification attribute" or other suitable lookup property. For example, the lookup table(s) 322 may be configured to map a specific identification attribute (e.g., a MAC address, a NetBIOS name, a FQDN, etc.) to a universally unique identifier (UUID) associated with an asset. As such, when an incoming record contains an identification attribute that matches an identification attribute stored in the appropriate lookup table 322, the incoming record may be matched to the asset UUID as stored in the lookup table 322. Accordingly, when the asset identification service 310 matches an incoming scan record to an asset UUID, a message may be published to a discovered asset topic 330. Furthermore, when one or more properties associated with an asset is newly seen or changed, a message may be published to a changed asset topic 332 to indicate the update, which may then be propagated to the scan indexing service 312 and to the replica full records database 324 via the indexer service 314. The asset identification service 310 may also update the properties associated with the asset in the full records database 320 accordingly.

Figure 4:
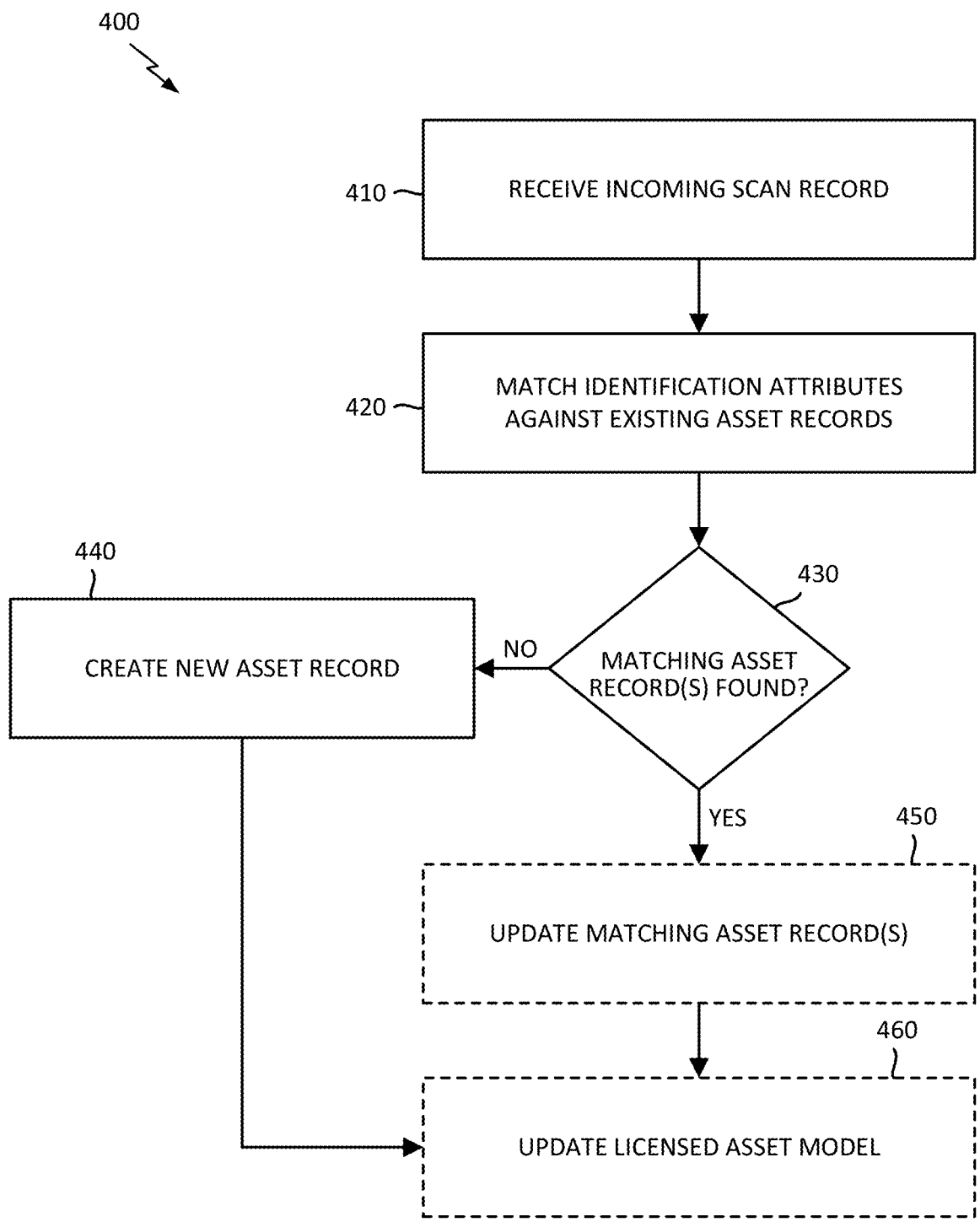
FIG. 4 illustrates an exemplary method for implementing an elastic asset-based licensing model in a vulnerability management system, according to various aspects.

According to various aspects, FIG. 4 illustrates an exemplary method 400 for implementing an elastic asset-based licensing model in a vulnerability management system. More particularly, the method 400 shown in FIG. 4 may generally be performed with respect to each incoming scan record received at the vulnerability management system, as depicted at block 410. For example, in various embodiments, the incoming scan records may be received from one or more active scanners, one or more cloud scanners, one or more agents that are locally installed on a given asset, one or more passive scanners configured to observe traffic in a network, one or more log correlation engines, and/or any suitable combination thereof. In various embodiments, the incoming scan records may each contain one or more identification attributes, which may be assigned an authoritative weight based on a probability that the identification attribute is unique and a probability of having multiples. Furthermore, in various embodiments, the incoming scan records may include a timestamp or other information that indicates when the scan that resulted in the record was performed, which may be referenced when determining whether to update a matching record (if any) using information contained in the incoming scan record, as will be described in further detail below.

In various embodiments, at a high-level, the one or more identification attributes contained in the incoming scan record may be matched against to existing asset records at block 420. For example, one possible algorithm that may be used to perform the record matching at block 420 will be described in further detail below with reference to FIG. 5. In response to determining at block 430 that no existing record matches the incoming scan record, the incoming scan record may be assumed to be describing a new asset, in which case a new asset record based on the incoming scan record may be created at block 440. Otherwise, in response to determining at block 430 that one or more existing records match the incoming scan record, the matching record(s) may optionally be updated at block 450 in the event that the incoming scan record includes new or changed information about the asset. For example, one possible algorithm that may be used to perform the update at block 450 will be described in further detail below with reference to FIG. 6. In either case (regardless of whether or not the incoming scan record matches an existing record), a licensed asset model may optionally be updated at block 460 based on the information contained in the incoming scan record, as will be described in further detail below with reference to FIG. 7 through FIG. 9.

According to various aspects, the following description is intended to provide additional detail relating to the various operations associated with the method 400 shown in FIG. 4 and provide context for the more detailed algorithms, aspects, and embodiments to be described in further detail below with reference to FIG. 5 through FIG. 9. In particular, as mentioned above, the method 400) may generally be used to perform an identification process that refers to matching an incoming scan record to an existing asset, wherein the incoming host may be assumed to describe a new asset that is to be added to one or more appropriate databases in the event that an existing matching asset cannot be found. The description provided herein goes into more detail about how incoming scan records are matched against existing already-discovered assets.

In general, an incoming scan record may essentially be a list of key-value pairs that represents known properties about a host. Accordingly, a subset of these properties may be designated as identification attributes (IA) that can be used to determine whether the host has been seen before. For example, in various embodiments, the IAs may include a universally unique identifier (UUID) (sometimes called a globally unique identifier or GUID), which may be a UUID that the vulnerability management system assigns to an asset when performing an agent-based scan, a credentialed scan, and/or another suitable authenticated scan (hereinafter referred to as a "VUUID"), a Basic Input/Output System (BIOS) UUID, or another suitable UUID that can be guaranteed with substantial certainty to not be a duplicate of another UUID that already has been created or will be created to identify another asset when generated according to standard methods. Furthermore, in various embodiments, the IAs may include a Media Access Control (MAC) address, a Network BIOS (NetBIOS) name, a Fully Qualified Domain Name (FQDN), an Internet Protocol (IP) address, and/or other suitable attributes that could potentially link a host to an existing asset (e.g., a third party UUID, a user-specified identifier such as a registry setting, file content, etc., a Secure Shell (SSH) key, etc.). In various embodiments, the IAs that may appear in a given scan record may be ordered on a spectrum from authoritative to speculative based on an ability to accurately link a host to an existing asset based on the fact that the various possible IAs may vary in their ability to accurately and uniquely link a host to an existing asset.

In particular, because UUIDs can uniquely identify an asset with near certainty when generated according to standard methods, UUIDs (and especially the VUUID) may be 100% authoritative, whereby a match between an incoming scan record and an existing asset UUID may be guaranteed to be a match on the correct asset. To the extent that there may be multiple UUIDs associated with a particular asset, the ordering of UUIDs on the spectrum may generally reflect the likelihood that the respective UUID(s) will appear in an incoming scan record rather than authoritativeness since any UUID is equally authoritative, at least theoretically. However, a particular asset will typically only have a single value for any UUID (i.e., a host will not have two BIOS UUIDs).

MAC addresses should be and typically are unique. However, under certain circumstances, a host could have more than one MAC address (e.g. multiple network interface cards (NICs), routers, etc.), which complicates using them as an identifier. Nonetheless, the possibility that an asset may have multiple MAC addresses may be handled in the update algorithm shown in FIG. 6 and described in further detail below.

NetBIOS names are guaranteed to be unique on a subnet and will probably be unique across an organization, although uniqueness cannot be guaranteed. However, a host will typically only have a single NetBIOS name.

FQDNs are guaranteed to be unique, assuming that the FQDN is actually fully-qualified. However, the FQDNs received at the vulnerability management system cannot be guaranteed to be fully-qualified and could just be a hostname. Nonetheless, if the vulnerability management system could distinguish between fully and partially qualified names, the FQDN could be given more weight. Other issues to note include that a host may have multiple FQDNs and any FQDN that is an IP address or "localhost" may be ignored.

IP addresses are not unique, a host may have more than one IP address, and IP addresses can change on a frequent basis. At least these factors make IP addresses very unreliable for identification purposes. However, IP addresses may be included among the considered IAs because most hosts have an IP address and it is easily discoverable.

In various embodiments, the ordering of the IAs can be calculated according to uniqueness and the probability that a given host with have multiples. Accordingly, as shown in the following table, an authoritative weight of one hundred (100) means the attribute is completely authoritative, whereas a weight of one (1) means that the chances of the attribute identifying the correct asset are greatly diminished and additional means should be used to further establish that the correct asset was identified. Occurrence Rate and Discoverability may not factor into authoritativeness but are interesting to note.

TABLE 1

Example Identification Attributes

| Identifier | Unique | Unique Weight | Multiple | Multiple Weight | Authoritative Weight | Occurrence Rate | Discoverability |
|---|---|---|---|---|---|---|---|
| VUUID | Yes | 10 | No | 10 | 100 | Very Low | Credentialed Scan |
| BIOS UUID | No | 8 | No | 10 | 80 | Very Low | |
| MAC | Yes | 10 | Yes | 5 | 50 | Low | |
| NetBIOS | Locally | 5 | No | 8 | 40 | Very Low | |
| FQDN | Maybe | 3 | Yes | 5 | 15 | High | All |
| IP | No | 1 | Yes | 5 | 5 | Very High | All |

In various embodiments, as shown above, identification attributes that are completely unique may receive a unique weight of ten (10) and the least unique attributes may receive a weight of one (1). Similarly, identification attributes that will occur only once may receive the highest or a relatively higher weight and attributes that will regularly be present multiple times may receive the lowest or a relatively lower weight. The authoritative weight may thus be calculated by multiplying the unique and multiple weights. Furthermore, although the description above noted that UUIDs can uniquely identify an asset with near certainty, the BIOS UUID attribute may not be unique when virtual machine instances are deployed from catalog templates. Those skilled in the art will also appreciate that these and other values described herein are exemplary only and that other suitable values, ranges, etc. could be suitably employed.

Figure 5:
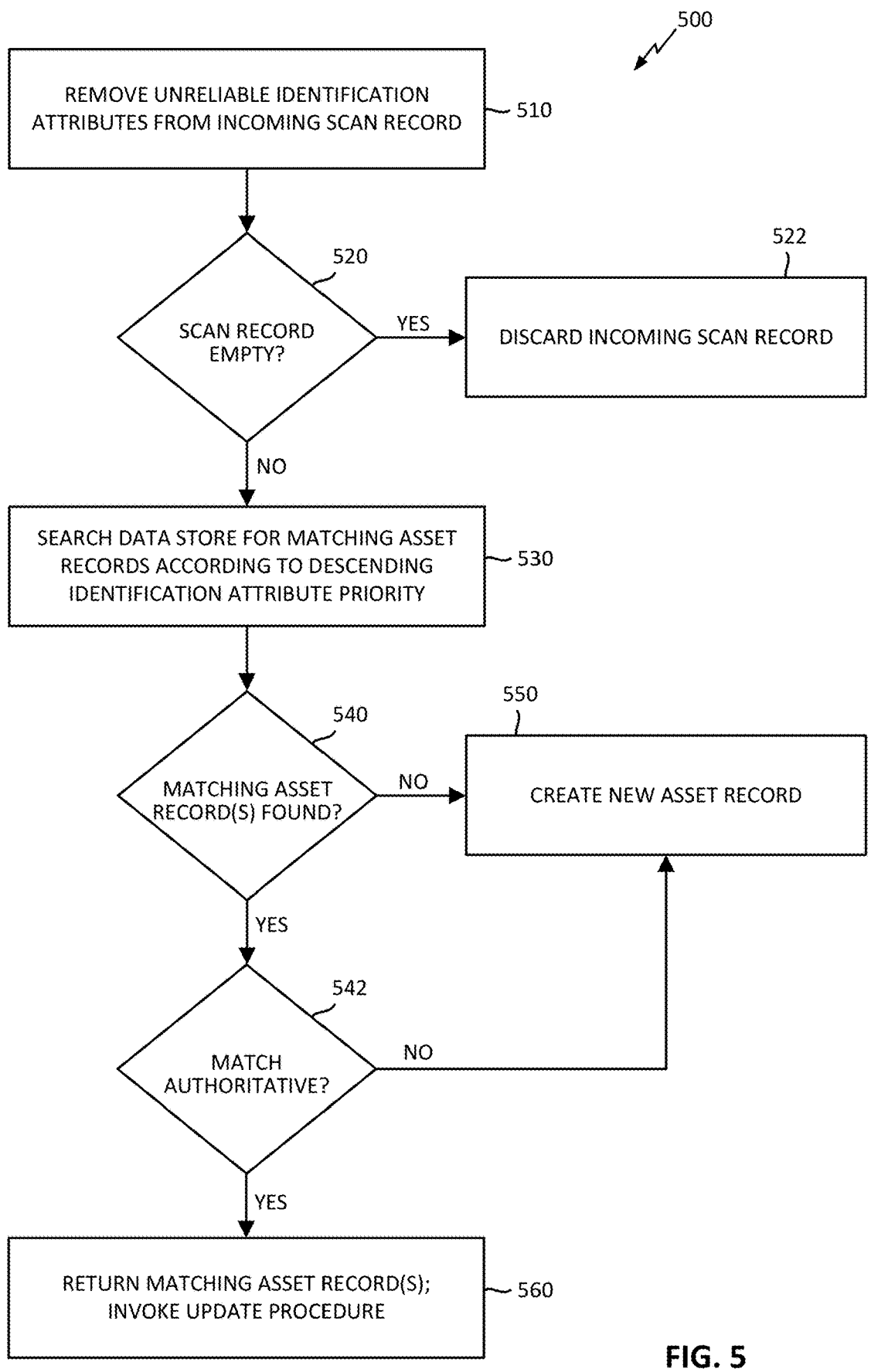
FIG. 5 illustrates an exemplary method for identifying assets based on incoming scan records, according to various aspects.

According to various aspects, having provided the above context relating to how one or more identification attributes that range from authoritative to speculative may be used to define a given asset, an exemplary method 500 for identifying assets based on incoming scan records will now be described with reference to FIG. 5. In particular, the method 500 may be performed with respect to a given incoming scan record, which may have one or more identification attributes. For example, the following table shows one possible scan record that may be compared to existing asset records to determine whether there is an existing asset that corresponds to the incoming scan record.

TABLE 2

Example Incoming Scan Record

| Attribute | Incoming Record |
|---|---|
| VUUID | 123 |
| BIOS UUID | 456 |
| MAC | 12:34: |
| NetBIOS | TESTHOST |
| FQDN | host.test |
| IP | .1 |

In various embodiments, when an incoming scan record is received, the scan record may be analyzed to determine whether the scan record contains any unreliable identification attributes. In particular, certain identification attribute values may be harmful or misleading for identification purposes and may therefore be discarded or otherwise removed from the scan record at block 510. For example, the IP address 127.0.0.1 and IPv6 equivalent are special purpose 'localhost' or 'loopback' addresses that computers use as their own address. As such, if the incoming scan record contains the IP address 127.0.0.1, the IPv6 equivalent, or any other invalid IP, the IP address attribute may be removed from the scan record at block 510. Similarly, if the incoming scan record contains a FQDN having the value 'localhost', an IP address, or an invalid FQDN (e.g., as determined using an isFQDN( ) function), then the FQDN attribute may be removed from the scan record at block 510. In another example, the NetBIOS name may be removed from the scan record at block 510 if the value is an IP address. In various embodiments, after having analyzed the incoming scan record and removed any unreliable identification attributes, block 520 may comprise determining whether the scan record is empty. If the scan record is empty, the scan record may be discarded at block 522. Otherwise, if block 520 results in a determination that the scan record is not empty (e.g., one or more identification attributes remain after any unreliable identification attributes have been removed), the method 500 may proceed to block 530.

More particularly, at block 530, the incoming scan record may be assumed to have a set of one or more identification attributes that each have an authoritative weight (e.g., as defined above in Table 1). As such, at block 530, an appropriate data store may be searched to determine whether there are one or more existing asset records in the data store that correspond to the incoming scan record. In various embodiments, the data store may be searched according to a descending identification attribute priority (i.e., from most authoritative to most speculative). Furthermore, in various embodiments, the incoming scan record may be matched against existing asset records based on current asset data regardless of when the scan resulting in the incoming record was performed. In other words, even if the incoming scan record is from a scan that was run in the past, the searching performed at block 530 may use current asset data rather than attempting to rewind the clock and use the asset state that may have existing when the host was originally seen and/or when the scan was performed. The reasoning for this is that an IP address is the only identification attribute likely to change over time, whereby the identification attributes associated with an asset in the past are likely to be same as the current identification attributes, minus the IP address. However, as mentioned above, there is already a low probability of correctly matching hosts to assets on IP address alone, whereby the chances of correctly identifying old scan results using old asset data are slim if the matching is based on IP address alone. Accordingly, if the incoming scan record is received out-of-sequence and has more identification attributes than just an IP address, then chances are that the identification attributes have not changed over time. For at least these reasons, the current asset data is effectively equivalent to the past asset data and lookups against either should return the same results.

Accordingly, at block 530, the data store may be searched for an existing record that matches the incoming scan record on a highest priority identification attribute, which is the vulnerability management system (VMS) UUID in the above example. In response to finding a matching record, the default identification algorithm may stop because UUIDs are considered authoritative. Otherwise, if a matching record was not found, the databases may be searched for a record with the next highest priority attribute, BIOS UUID, and the identification process may likewise stop there if a matching record is found. If no UUID match occurs, this process may repeat for all the remaining attributes. In various embodiments, at block 540, a determination may be made as to whether one or more asset records matching the incoming scan record were found in the data store. In response to determining that no matching asset records were found after searching on all identification attributes contained in the incoming scan record, the incoming scan record may be assumed to correspond to a new asset that does not exist in the data store, whereby a new asset record may be created at block 550 based on the identification attributes contained in the scan record. Otherwise, in response to determining at block 540 that one or more matching asset records were found in the data store, the method may proceed to block 542 to determine whether the match is considered authoritative in an effort to either gain confidence in the match or determine that a bad match was made.

More particularly, the matching that is performed according to descending identification attribute priority may generally work well when the incoming scan record and the existing asset record(s) have a substantial number of identification attributes and/or authoritative identification attributes. When that is the case, block 542 may result in a determination that the match is authoritative and the matching asset record(s) may be appropriately returned at block 560. Furthermore, at block 560, an update procedure may be invoked with respect to the matching asset record(s), as described in further detail below with reference to FIG. 6. Alternatively, when the incoming scan record and the existing asset record(s) both do not have a substantial number of identification attributes and do not have authoritative identification attributes, further analysis may be performed at block 542 to determine whether the match is authoritative.

In particular, as noted above, attempting to match on IP address and/or other non-unique identification attributes tends to be substantially unreliable. Accordingly, where the incoming scan record and the matching asset record(s) found in the data store have values for multiple fields but only produce a match on a non-unique field, block 542 may comprise cross-checking more authoritative values to either gain further confidence in the match or determine that a bad match was made. For example, where the incoming scan record and the matching asset record(s) have non-matching values in one or more fields that are more authoritative than the non-unique field in which the match was produced, then block 542 may result in a determination that the match is not authoritative and a new asset record may be created at block 550 in the same manner as though no match was found. Otherwise, where the incoming scan record and the matching asset record(s) do not have contradicting values in any fields that are more authoritative than the non-unique field in which the match was produced, the match may be returned as authoritative and the update procedure may be invoked at block 560. The following examples are provided to further explain how the cross-checking performed at block 542 may play out in different scenarios.

In the following example, both the incoming record and the existing (matching) record have values present on each identification attribute and the only value that matches is IP address. As such, in the following example, the incoming record may be determined not to match the existing record because the records only match on a non-unique field (i.e., IP address) and both records have non-matching values in other fields that are more authoritative than the matching non-unique field.

| Non-Unique Match Example 1 :: No Match | | |
|---|---|---|
| Attribute | incoming Record | Existing Record |
| VUUID | 123 | 456 |
| MAC | 12:34: | 56:78: |
| NetBIOS | HOSTX | HOSTONE |
| FQDN | x.host | one.host |
| IP | .1 | .1 |

The following example presents a potentially common scenario in which both the incoming record and the existing record only have values present on the FQDN and IP address fields. Because the FQDN fields do not match and FQDN has a higher authoritative weight than IP address, the incoming record may be determined not to match with low confidence. Furthermore, where the incoming record and the existing record only contain values on the FQDN and IP address attributes, the identification method 500 may not differentiate between virtual hosts and physical hosts moving around a network via DHCP. To determine whether to overwrite or append the contradicting attributes, it may be necessary to know whether both records arrived in the same scan or different scans. If that scan information is unavailable (e.g., because one or both records were obtained via passive scanners), the records may be assumed represent hosts moving around via DHCP and an even lower confidence level may be assigned.

| Non-Unique Match Example 2 :: No Match | | |
|---|---|---|
| Attribute | Incoming Record | Existing Record |
| VUUID | — | — |
| MAC | — | — |
| NetBIOS | — | — |
| FQDN | two.host | one.host |
| IP | .1 | .1 |

The following illustrates an unlikely example in which a match on a non-unique field with a low authoritative weight may nonetheless result in a match. In the following example, the incoming scan record and the existing record do not share any fields that have attribute values present except for IP address. Therefore, because nothing can be inferred about the relationship (or lack thereof) between the records, the existing record may be returned as a match but with low confidence.

| Non-Unique Match Example 3 :: Match | | |
|---|---|---|
| Attribute | Incoming Record | Existing Record |
| VUUID | 123 | — |
| MAC | — | 56:78: |
| NetBIOS | — | HOSTONE |
| FQDN | — | one.host |
| IP | .1 | .1 |

The following illustrates an example likely to occur in practice, especially in a network that obtains scan records based on passive scanners or other observed network activity. In a similar manner as Example 3, the incoming record and the existing record only match on IP address. However, the difference between the following example and Example 3 is that no information is available about the incoming record except IP address. Thus, because the incoming scan record and the existing record again do not have any conflicting values in fields that are more authoritative than IP address, a match may be returned but with low confidence, especially in a DHCP environment.

| Non-Unique Match Example 4 :: Match | | |
|---|---|---|
| Attribute | Incoming Record | Existing Record |
| VUUID | — | — |
| MAC | — | 56:78: |
| NetBIOS | — | HOSTONE |
| FQDN | — | one.host |
| IP | .1 | .1 |

In the following example, the incoming record may be determined not to match the existing record because none of the identification attributes match except NetBIOS. As such, because the match is only present on a non-unique field and there are contradicting values in more authoritative fields (including VUUID and MAC address which have high authoritative weight), the incoming record may be determined with high confidence not to match the existing record.

| Non-Unique Match Example 5 :: No Match | | |
|---|---|---|
| Attribute | Incoming Record | Existing Record |
| VUUID | 123 | 456 |
| MAC | 12:34: | 56:78: |
| NetBIOS | HOSTX | HOSTX |
| FQDN | x.host | one.host |
| IP | .1 | .4 |

The following example illustrates a potential scenario where the incoming scan record matches multiple existing records on different identification attributes that have different authoritative weights. More particularly, the incoming scan record and the existing records each have values present on at least some identification fields, wherein the incoming scan record matches the first existing record on the NetBIOS field which has an authoritative weight of 40 and the second existing record on the FQDN field which has an authoritative weight of 15. The first match may therefore take precedence because the NetBIOS field has a higher authoritative weight. However, the first match will be determined invalid due to contradicting values on the more authoritative VUUID and MAC attributes. The comparison may thus proceed to the second existing record, which will be accepted because there are no contradicting values on any fields that are more authoritative than FQDN.

| Non-Unique Match Example 6 :: Match | | | |
|---|---|---|---|
| Attribute | Incoming Record | Existing Record #1 | Existing Record #2 |
| VUUID | 123 | 456 | — |
| MAC | 12:34: | 56:78: | — |
| NetBIOS | HOSTX | HOSTX | — |
| FQDN | x.host | one.host | x.host |
| IP | .1 | .4 | .1 |

The following illustrates another example where the match may be accepted. In particular, in the following example, the incoming scan record and the existing record match on the non-unique NetBIOS field do not share any fields with more authoritative values. Accordingly, even though the FQDN and IP address fields both have values, those fields are less authoritative than the matching field and therefore would not be cross-checked. As such, a match would be returned in the following example.

| Non-Unique Match Example 7 :: Match | | |
|---|---|---|
| Attribute | Incoming Record | Existing Record |
| VUUID | 123 | — |
| MAC | — | 56:78: |
| NetBIOS | HOSTX | HOSTX |
| FQDN | two.host | one.host |
| IP | .2 | .1 |

Figure 6:
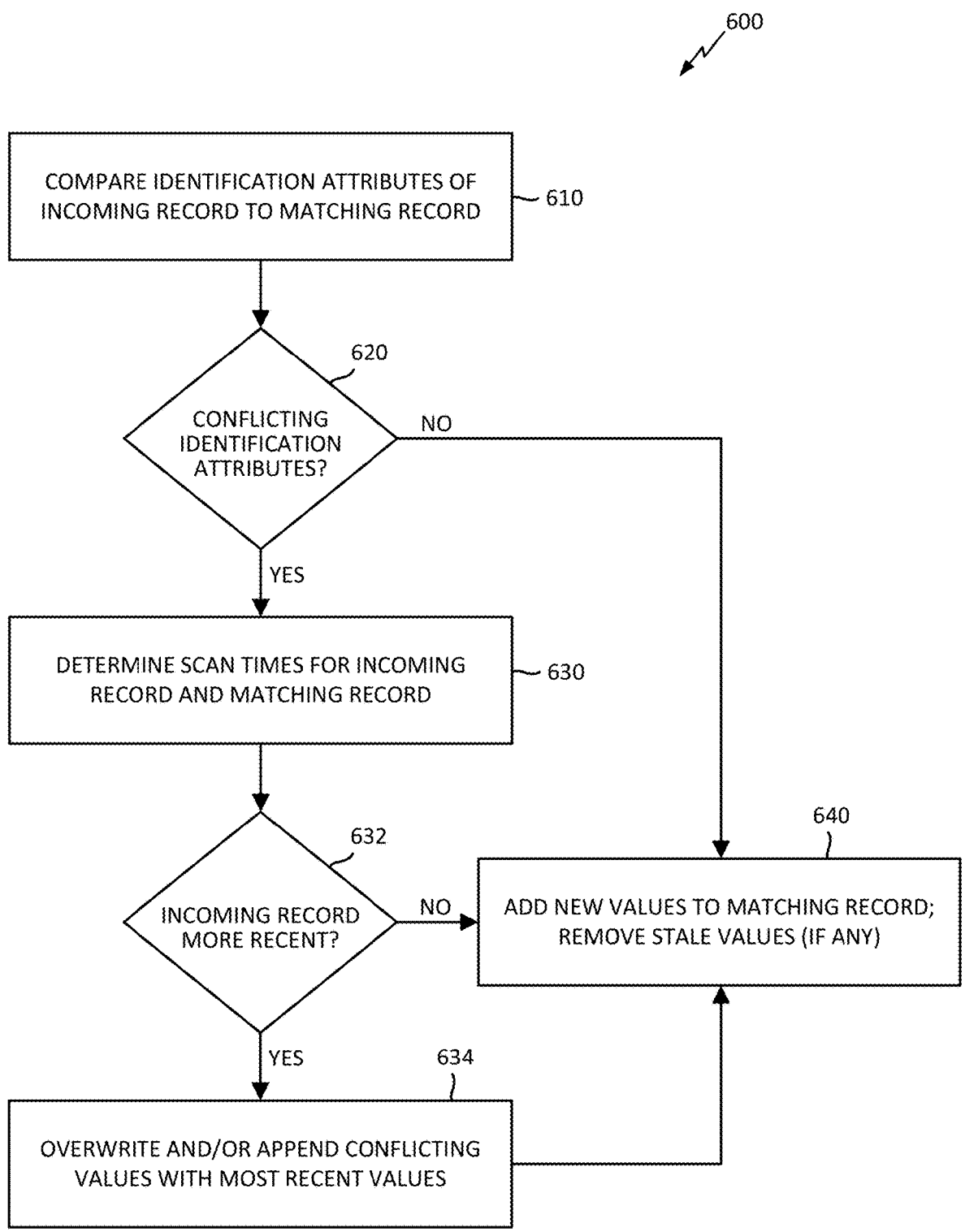
FIG. 6 illustrates an exemplary method to update an asset record based on information contained in a matching incoming scan record, according to various aspects.

According to various aspects, FIG. 6 illustrates an exemplary method 600 to update an asset record based on information contained in a matching incoming scan record, wherein the method 600 shown in FIG. 6 may be invoked in response to a data store containing one or more existing asset records that match an incoming scan record. As such, the updating method 600 described in further detail herein may generally update an existing asset record to incorporate new or changed information discovered about the existing asset when an incoming scan record matches to the existing asset. As such, at block 610, the identification attributes contained in the incoming scan record may be compared to the identification attributes contained in the existing asset record matched to the incoming scan record. In response to determining at block 620 that one or more of the identification attributes contained in the incoming scan record conflict with corresponding identification attributes in the matching record, scan times for the incoming record and the matching record may be determined at block 630. For example, in various embodiments, scan records may arrive at the vulnerability management system chronologically out-of-order, wherein block 630 may determine the scan times for the incoming record and the matching record to ensure that existing values are only replaced with more recent incoming values. As such, in response to determining at block 632 that the incoming scan record is more recent than the scan time currently associated with the matching record, the conflicting values may either be overwritten or appended with the most recent values contained in the incoming scan record at block 634. In particular, as noted above, at least some identification attributes are permitted to have multiples, meaning that a single asset can have multiple different values for a given identification attribute. For example, one situation in which this can often arise is with respect to a MAC address where a given asset has multiple network interface cards (NICs) that each have a unique MAC address. In various embodiments, referring still to FIG. 6, one or more additional updating procedures may be performed at block 640 regardless of whether conflicting identification attributes are identified at block 620 and/or the incoming record is determined to be more recent at block 632. For example, as will be described in further detail herein, any identification attributes that are present in the incoming record and missing in the existing matching record may be added to the existing asset record, the existing asset record may be updated to remove one or more stale values (if any), and the existing asset record may be merged with one or more other asset records that have duplicate values to avoid counting the same asset multiple times (e.g., for licensing purposes, vulnerability metrics, etc.).

In general, the foregoing description of the update method 600 shown in FIG. 6 is provided at a relatively high-level to demonstrate the overall algorithm used to update existing asset records that are matched to one or more incoming scan records. As such, the following description is intended to provide various illustrative examples to show how the update method 600 may actually be performed in practice.

More particularly, the following example illustrates one possible scenario where an incoming record arrives out-of-sequence (i.e., the incoming scan record has an earlier scan time relative to a scan time for one or more records having an earlier arrival time). In this example, a first incoming scan record associated with VUUID 'abc' arrives at time :00 with a scan time of :0) and a second incoming scan record associated with the same VUUID arrives at time :10 with a scan time of :20. However, the first scan record and the second scan record have conflicting IP address values (block 620). As such, because the second scan record has a more recent scan time than the first scan record (blocks 630, 632), the IP address associated with the matching record is overwritten using the IP address contained in the second (more recent) scan record (block 634). Continuing with this example, a third incoming scan record arrives out-of-order at time :20. Accordingly, even though the IP address contained in the third record conflicts with the existing IP address stored in the matching asset record, the IP address is not overwritten because the third scan record is not more recent than the scan time stored in the matching asset record (block 632). However, a fourth incoming scan record arrives at time :30, with a scan time of :30, which is later than the :20 scan time stored in the matching asset record. As such, because the fourth record is more recent (block 632), the IP address stored in the matching asset record is overwritten (block 634) with the IP address contained in the fourth scan record.

| Out-of-Sequence Example 1 :: Incoming Scan Records | | | | |
|---|---|---|---|---|
| Arrival Time | :00 | :10 | :20 | :30 |
| Scan Time | :00 | :20 | :10 | :30 |
| VUUID | abc | abc | abc | abc |
| IP | .1 | .2 | .3 | .4 |

| Out-of-Sequence Example 1 :: Data Store Over Time | | | |
|---|---|---|---|
| :00 | :10 | :20 | :30 |
| Asset 1 | Asset 1 | Asset 1 | Asset 1 |
| abc | abc | abc | abc |
| .1 | .2 | .2 | .4 |
| :00 | :20 | :20 | :00 |

The following example illustrates another scenario where an incoming record arrives out-of-sequence, except in the following example the existing asset record is still updated despite the later scan time. In the following example, a first scan record and a second scan record that have matching VUUID and NetBIOS values arrive in sequence. However, neither the first scan record nor the second scan record have an IP address value. Accordingly, when an out-of-order record with an IP address value arrives at time :20, the new IP address value is added to the existing record (block 640) because the asset record did not already have an IP address value (i.e., the IP address value in the out-of-order record does not conflict with an existing IP address). However, the NetBIOS value in the existing record is not overwritten using the different NetBIOS value in the third record because the existing NetBIOS value is associated with a more recent scan time than the NetBIOS value contained in the third record.

| Out-of-Sequence Example 2 :: Incoming Scan Records | | | | |
|---|---|---|---|---|
| Arrival Time | :00 | :10 | :20 | :30 |
| Sean Time | :00 | :20 | :10 | :30 |
| VUUID | abc | abc | abc | abc |
| NetBIOS | X | X | Y | Z |
| IP | — | — | .1 | .2 |

| Out-of-Sequence Example 2 :: Data Store Over Time | | | |
|---|---|---|---|
| :00 | :10 | :20 | :30 |
| Asset 1 | Asset 1 | Asset 1 | Asset 1 |
| abc | abc | abc | abc |
| X | X | X | Z |
| — | — | .1 | .2 |
| :00 | :20 | :20 | :30 |

In various embodiments, as noted above, one asset may have multiple NICs, which could result in the asset having multiple valid MAC addresses, FQDNs, and/or IP addresses. Alternatively, the IP address assigned to a given asset may change over time such that an older IP addresses may be invalid. Accordingly, in various embodiments, additional logic may be built into block 634 to handle potential scenarios where a given asset may (or may not) have multiple NICs. The following table shows possible permutations that may arise when an incoming scan record matches an existing asset on an authoritative identifier (e.g., VUUID) and the incoming scan record and the existing asset record have different MAC addresses, FQDNs, and/or IP addresses. In the following table, the value 'Missing' may generally denote that the corresponding attribute is missing in either the incoming record, the existing record, or both, while the value 'Different' means that that the corresponding attribute is present in both the incoming record and the existing record but the values differ from one another.

TABLE 3

| Multiple NIC Permutations | | | | |
|---|---|---|---|---|
| MAC | FQDN | IP | Change Description | Action |
| Different | Different | Different | Extra NIC | Append |
| Different | Different | Missing | Extra NIC (likely) | Append |
| Different | Missing | Different | Extra NIC (likely) | Append |
| Different | Missing | Missing | Extra NIC (somewhat likely) | Append |
| Missing | Different | Different | Extra NIC (likely) | Append |
| Missing | Different | Missing | Repurposed machine | Replace |
| Missing | Missing | Different | DHCP | Replace |
| Missing | Missing | Missing | Standard | Replace |

In general, as shown in the foregoing table, the existing asset matched to the incoming scan record may be determined to have multiple NICs (or likely to have multiple NICs) when the incoming scan record has a different MAC address than the MAC address(es) stored on the existing asset or where the incoming scan record has different FQDN and IP address values and one or more of the incoming scan record or the existing asset record are missing a MAC address. In such cases, the different values contained in the incoming scan record may be appended to the existing (conflicting) values contained in the existing asset record. Otherwise, the values contained in the incoming scan record may replace the values contained in the existing asset record where the conflict(s) are attributed to the existing asset being a repurposed machine given a different FQDN, an asset that has received a new IP address via DHCP, or a standard replace/overwrite where each of the MAC address, FQDN, and IP address fields are missing values in either the incoming record, the existing record, or both.

For example, the following shows a scenario where the incoming record has a different MAC address and the FQDN and IP address fields are missing values in either the incoming record, the existing record, or both. In this case, it is somewhat likely that the existing asset has multiple NICs, whereby the MAC address contained in the incoming record is appended to the existing MAC address associated with the asset.

| Multiple NIC Example 1 :: Incoming Scan Records | | |
|---|---|---|
| Time | :01 | :02 |
| VUUID | abc | abc |
| MAC | 12:34: | 56:78: |
| FQDN | x.host | — |
| IP | — | .2 |

| Multiple NIC Examle 1 :: Data Store Over Time | |
|---|---|
| :01 | :02 |
| Asset 1 | Asset 1 |
| abc | abc |
| 12:34: | 12:34:; 56:78: |
| x.host | x.host |
| — | .2 |

The following example shows another scenario where the MAC address field is missing a value in both the incoming scan record and the existing asset record and the incoming scan record and the existing asset record have different FQDN and IP address values. In this case, the existing asset may again be considered likely to have multiple NICs. As such, the FQDN and IP address contained in the incoming record may be appropriately appended to the existing FQDN and IP address associated with the asset.

| Multiple NIC Example 2 :: Incoming Scan Records | | |
|---|---|---|
| Time | :01 | :02 |
| VUUID | abc | abc |
| MAC | — | — |
| FQDN | x.host | y.host |
| IP | .1 | .2 |

| Multiple NIC Example 2 :: Data Store Over Time | |
|---|---|
| :01 | :02 |
| Asset 1 | Asset 1 |
| abc | abc |
| — | — |
| x.host | x.host; y.host |
| .1 | .1; .2 |

In various embodiments, as mentioned above, there may be a desire to remove stale data from one or more asset records from time to time in order to make the asset identification and update procedures described herein more reliable. As such, when the identification method 500 shown in FIG. 5 results in a match on an authoritative value (e.g., VUUID) and/or the incoming scan record has more than a threshold number of identification attributes, the vulnerability management system may assume that the incoming scan record provides a full picture of the corresponding asset. As such, in addition to overwriting any old values contained in the existing asset record with new values contained in the incoming scan record, one or more stale values (if any) may be removed from the existing asset record at block 640. More particularly, the one or more stale values may comprise existing values for any identification attributes that do not appear in the incoming scan record. In general, this logic may be based on the assumption that the incoming scan record provides a complete picture of the asset such that older values could be stale and should therefore be removed. However, simply removing the older values whenever match is identified on an authoritative value or an incoming scan record has more than the threshold number of identification attributes runs the risk that valid data will be removed from the existing asset record. Accordingly, in various embodiments, the process to remove stale values may be combined with an age out mechanism, whereby one or more existing values may be removed from the existing asset record when incoming scan records providing a complete picture of the asset are received a threshold number of times or within a predetermined time period (e.g., n days) without the existing values appearing in any of the incoming scan records.

According to various aspects, as mentioned above, the asset management (identification and updating) features described in further detail above may be suitably used in a vulnerability management system in which one or more scanners are configured to discover and help remediate vulnerabilities in a managed network. In that context, the vulnerability management system and any supporting software components (e.g., active scanners, passive scanners, cloud scanners, agents, log correlation engines, etc.) may be provided to a customer who owns the managed network under a Software as a Service (SaaS) model in which the appropriate software components are licensed on a subscription basis (e.g., on a monthly, annual, or other suitable basis). Furthermore, in various embodiments, the license fee for the vulnerability management system may be priced according to asset quantities based on a number of vulnerability-related sightings. In particular, as described earlier, various components such as the active scanners, passive scanners, etc. may perform one or more functions that relate to discovering assets that are present in a managed network in addition to detecting and helping to remediate known vulnerabilities that may exist on the discovered assets. As such, in various embodiments, the asset quantities may be based only on the number of vulnerability-related sightings that occur within a given licensing period, whereby any discovery-related sightings may not affect the licensed asset quantities. Accordingly, whereas the conventional industry-standard approach is based on IP address, the identification and updating features described herein may enable a substantially asset-centric approach to vulnerability management that accurately tracks the true identity of a resource and prioritizes vulnerabilities while accommodating transient, short-lived, or otherwise dynamic assets like laptops, mobile devices, cloud instances, containers, etc.

The asset-centric approach to vulnerability management as described herein may advantageously enable customers to identify and remediate vulnerabilities across many technologies, which may allow the customers to better understand the true state of their environment, including exposure to potential cyberattacks. For example, because the asset identification and updating aspects described herein may consider multiple identification attributes and not just IP addresses, new incoming scan records can be matched to already discovered assets to eliminate counting the same asset multiple times and ensure more accurate vulnerability reporting. Furthermore, the asset identification and updating aspects may enable an elastic or soft asset-based licensing model that aligns vulnerability management licensing with increasingly elastic modern information technology environments. In particular, under the elastic licensing model, each asset may consume a single license, thus providing a customer-friendly approach that avoids multiple counting an asset that has multiple and/or changing IP addresses. Furthermore, licenses may be automatically reclaimed from assets that have not been scanned recently (e.g., within a current asset "look-back" period), including assets that are retired, decommissioned, inadvertently scanned, infrequently active, etc. However, the vulnerability management system may retain vulnerability data and/or configuration data associated with any assets from which the licenses are reclaimed such that the customer can continue to view the vulnerability and/or configuration data. Further, should the assets later be scanned again, the previous vulnerability and/or configuration data may still be available, so there is substantially no customer downside to the automated license reclamation aspects described herein. The vulnerability management system may further enable the customer to monitor and adjust license consumption and only true-up when necessary. In other words, the elastic asset-based licensing model may not have any technical limitations that would restrict the customer from exceeding a total number of licensed assets (i.e., the vulnerability management system does not lock out functionality of any licensed software components if the licensed amount is temporarily exceeded). As such, the elastic asset-based licensing model may permit temporary increases or surges in the number of licensed assets without requiring the customer to purchase additional licenses. For example, if a given customer has a substantial increase in assets for a short time period within a given licensing period, the substantial increase may be tolerated without requiring the customer to purchase additional licenses as long as the increase is not indicative of a general expansion in the customer network, in which case the customer may be required to purchase additional licenses based on the number of scanned assets in the expanded network.

Figure 7:
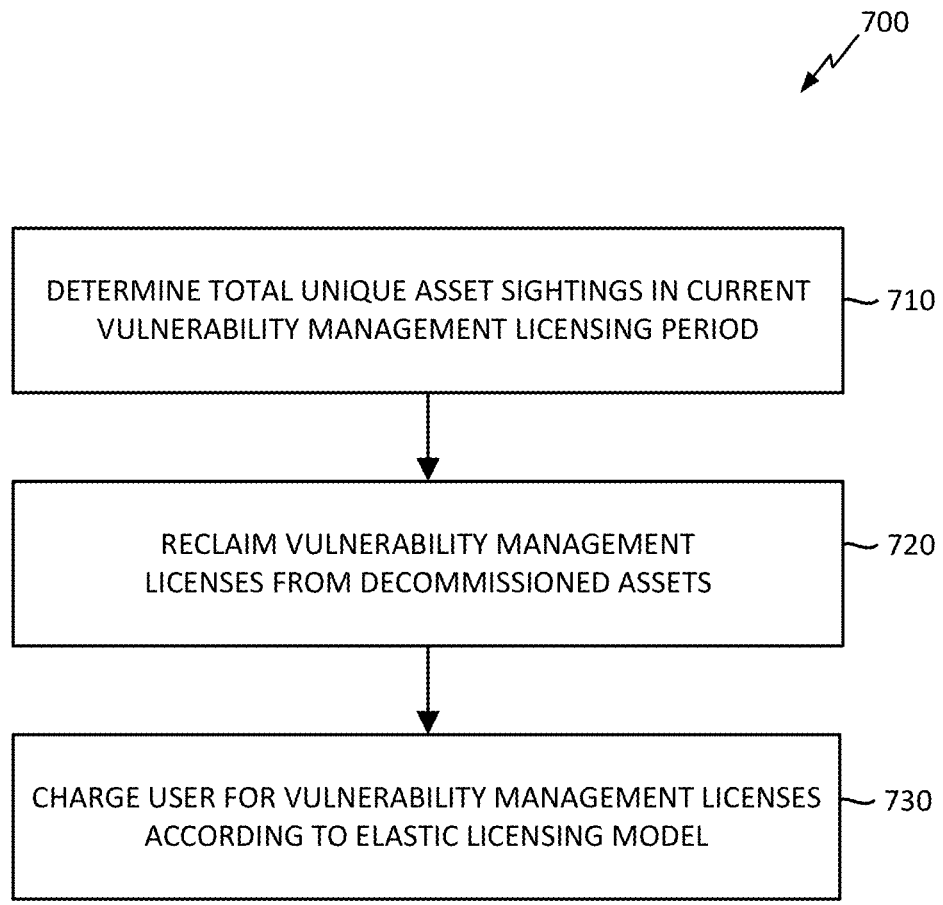
FIG. 7 illustrates an exemplary method for implementing an elastic asset-based licensing model in a vulnerability management system, according to various aspects.

For example, according to various aspects, an exemplary method 700 for implementing an elastic asset-based licensing model in a vulnerability management system will now be described with reference to FIG. 7. In general, the method 700 shown in FIG. 7 may track vulnerability management licenses in a managed network according to a total number of assets that are "seen" (i.e., scanned from a vulnerability management perspective) in a current licensing period. More particularly, at block 710, the total unique asset sightings in the current vulnerability management licensing period may be determined (e.g., assets scanned within the last three months or another suitable period), wherein whether an asset is "seen" within the current licensing period may depend on whether the asset was scanned from a vulnerability management perspective. As such, certain asset "sightings" may not be included in the total unique asset sightings that are counted at block 710. For example, asset discovery may be conducted free-of-charge to encourage users to discover and start to actively manage assets. As such, when an active scanner performs a host discovery scan, a passive scanner discovers a host while operating in a host discovery mode, imported asset data does not contain vulnerability information, etc., such sightings may be excluded for licensing purposes.

Figure 8:
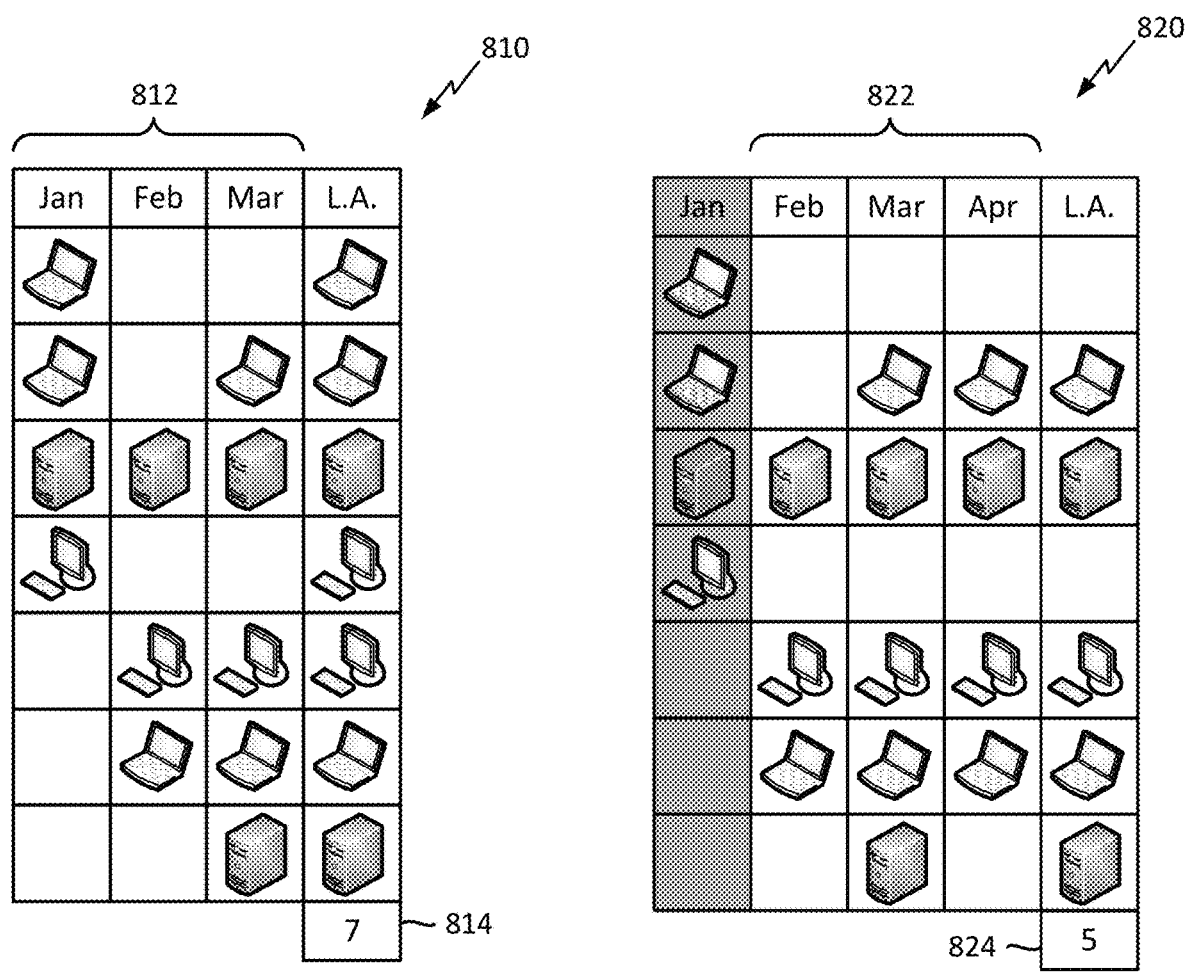
FIG. 8 illustrates exemplary licensed assets over time, including one or more assets from which licenses can be reclaimed, according to various aspects.

The unique asset sightings may therefore be limited to sightings that occur when an active scanner performs an active scan to discover vulnerabilities on a given host, a passive scanner discovers a vulnerability on a particular host while operating in a vulnerability discovery mode, imported asset data does contain information regarding vulnerabilities, and so on. For example, FIG. 8 illustrates exemplary licensed assets over time, including a first table 810 that shows a total licensed asset count 814 based on a number of unique asset sightings that occurred within a current asset look-back period 812, which encompasses three (3) months or approximately ninety (90) days in the illustrated example. In the first table 810, each row represents a unique asset and the columns represent whether the asset was seen in a particular period. In the example illustrated in FIG. 8, there are seven (7) unique assets scanned in the current asset look-back period 812, whereby seven is the licensed asset count for the current asset look-back period 812. As such, the identification and updating features described in further detail above may be used to count or otherwise determine the total unique assets that are scanned within the current licensing period and the customer may be charged for vulnerability management licenses accordingly on a per-asset basis. Accordingly, when a device has multiple IP addresses or other duplicative identifiers, the customer can be assured that each asset is only consuming one vulnerability management license. As a result, the customer purchases the correct number of licenses based on assets that are scanned for vulnerabilities rather than IP address counts, which are often inflated.

Referring again to FIG. 7, at block 720, one or more vulnerability management licenses may be suitably reclaimed from assets that were not scanned in the current licensing period (e.g., because the assets were decommissioned, retired, inadvertently scanned, etc.). For example, FIG. 8 shows a second table 820 in which a current asset look-back period 822 includes five (5) licensed assets 824. In particular, assets that were scanned prior to the current asset look-back period 822 and not scanned in the current look-back period 822 may no longer counted for licensing purposes. For example, in FIG. 8, the assets in the first and fourth rows were not scanned within the current asset look-back period 822 and are therefore not counted for licensing purposes. However, the assets in the second and third rows were scanned within the current asset look-back period 822 and therefore continue to count for licensing purposes. As such, referring again to FIG. 7, the customer may be charged for vulnerability management licenses at block 730 according to the elastic asset-based licensing model based on the total unique asset sightings in the current licensing period after any licenses have been reclaimed from previously licensed assets that were not scanned in the current licensing period. For example, with reference to FIG. 8, only five (5) unique assets were scanned in the current asset look-back period 822, whereby the customer may only be charged for five vulnerability management licenses at block 730. Furthermore, as noted above, the customer may still be permitted to see the available vulnerability and/or configuration data associated with the assets from which the vulnerability management licenses are reclaimed; the customer simply will not be charged to do so. As such, the licensing structure may permit the customer to pay for licenses based on their current network to be flexible to meet needs and not be overcharged.

The above-mentioned aspects may be substantially autonomous and enabled via the asset identification and updating aspects described in further detail above. Furthermore, as noted above, the licensing structure may have a soft or elastic approach, in that technical limitations do not restrict the customer from exceeding a total number of licensed assets and temporary increases or surges in the number of licensed assets may be tolerated without requiring the customer to purchase additional licenses. For example, if a given customer has a substantial increase in assets for a short time period within a given licensing period, the substantial increase may be temporarily tolerated without requiring the customer to purchase additional licenses as long as the increase is not indicative of a general expansion in the customer network, in which case the customer may be required to purchase additional licenses based on the number of scanned assets in the expanded network. This principle is illustrated in FIG. 9, which depicts an exemplary graph 900 to depict how an elastic licensing model may permit a customer network to temporarily exceed a licensed asset count and purchase additional licenses following network expansion, according to various aspects.

Figure 9:
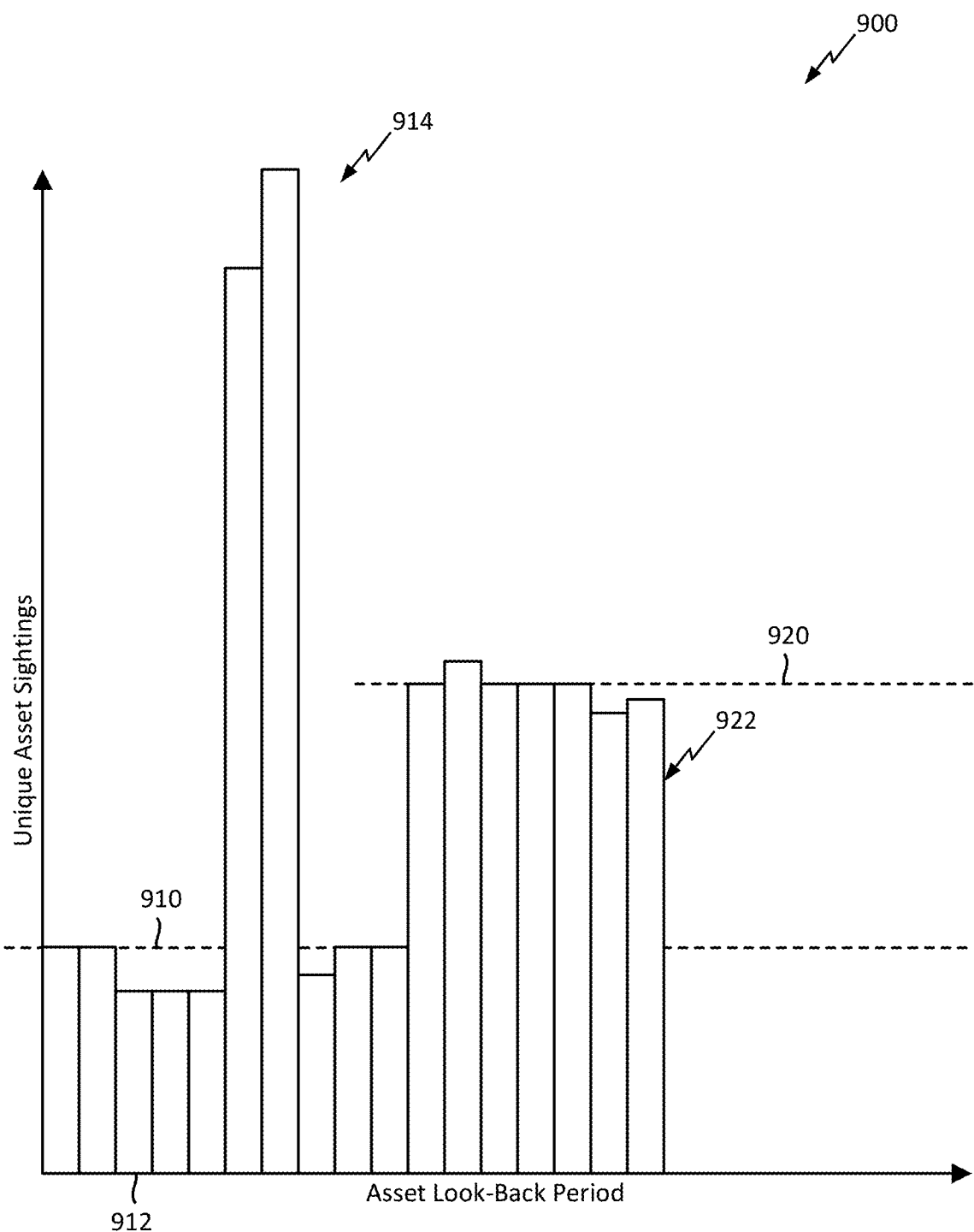
FIG. 9 illustrates an exemplary graph to depict how an elastic licensing model may permit a customer network to temporarily exceed a licensed asset count and purchase additional licenses following network expansion, according to various aspects.

More particularly, referring to FIG. 9, the vertical axis corresponds to unique asset sightings and the horizontal axis 912 corresponds to an asset look-back period, which may have a step size of a certain number of months (e.g., one month, three months, etc.), a certain number of days (e.g., ninety days, one hundred twenty days, etc.). Furthermore, those skilled in the art will appreciate that the asset look-back period as contemplated herein may be a rolling or sliding window. For example, assuming that the asset look-back period is three months, the first bar in the graph 900 may encompass the months of January-March, the second bar may encompass the months of February-April, the third bar may encompass the months of March-May, and so on. As depicted in FIG. 9, a customer network may include a certain number of vulnerability-related sightings in the first couple asset look-back periods, which may correspond to an initial licensed amount, as depicted at 910. As further depicted at 914, there is a substantial increase in unique asset sightings over a relatively short time period. Because the customer is permitted to temporarily exceed the licensed asset count 910, the customer is not charged any additional license fees for the surge that occurs at 914. Indeed, the subsequent few bars show the unique asset sightings returning to previous levels and remaining at or below the licensed asset count 910. However, the unique asset sightings in the subsequent look-back periods again exceed the licensed asset count 910 and continue to exceed the licensed asset count 910 for several cycles. Accordingly, as depicted at 922, the increase in unique asset sightings appears to reflect an expansion in the managed network and the customer may be required to purchase additional licenses to increase the licensed asset count to a level 920 in line with the current network state.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM. CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for elastic asset-centric vulnerability management, comprising:
receiving, at a vulnerability management system, a first scan record from one or more vulnerability scanners in communication with a managed network, wherein the first scan record comprises a first set of identification attributes that include at least a first Internet Protocol (IP) address;
searching existing asset records in an asset data store based on the first set of identification attributes contained in the first scan record;
creating, in the asset data store, an asset record to define a unique electronic object having the first set of identification attributes in response to the existing asset records in the asset data store not including a match for the first scan record;
receiving, at the vulnerability management system, a second scan record from the one or more vulnerability scanners, wherein the second scan record comprises a second set of identification attributes that include at least a second IP address;
matching the second scan record to the asset record corresponding to the unique electronic object having the first set of identification attributes based on the second set of identification attributes including at least one value that appears in the first set of identification attributes despite a mismatch between the first and second IP addresses; and
updating, in response to the matching, the asset record based on the second scan record without generating a new asset record associated with the second scan record,
wherein the first and second sets of identification attributes each include one or more of multiple possible identification attributes that are ordered on a spectrum from authoritative to speculative.

2. The method recited in claim 1, wherein the existing asset records in the asset data store are searched according to a descending priority of the multiple possible identification attributes from most authoritative to most speculative.

3. The method recited in claim 1, wherein each of the multiple possible identification attributes are ordered on the spectrum from authoritative to speculative based on an authoritative weight that depends on at least a uniqueness property that indicates a probability of different information technology assets sharing the same value for the respective identification attribute.

4. The method recited in claim 3, wherein the authoritative weight further depends on a multiples property that indicates a probability of one information technology asset having multiple valid values for the respective identification attribute.

5. The method recited in claim, 1 wherein the multiple possible identification attributes include a universally unique identifier (UUID), a Media Access Control (MAC) address, a Network BIOS (NetBIOS) name, a Fully Qualified Domain Name (FQDN), and an IP address ordered from most authoritative to most speculative.

6. The method recited in claim 1, further comprising removing one or more non-unique identification attributes from one or more of the first scan record or the second scan record prior to searching the existing asset records in the asset data store.

7. The method recited in claim 1, wherein searching the existing asset records based on the first set of identification attributes comprises:
identifying at least one existing asset record that only matches the first set of identification attributes on a non-unique identification attribute; and
determining that the at least one existing asset record is not a match for the first scan record in response to the at least one existing asset record and the first set of identification attributes having different values on one or more identification attributes that have a higher authoritative weight than the non-unique identification attribute.

8. The method recited in claim 1, wherein matching the second scan record to the asset record associated with the first set of identification attributes comprises:
determining that the first set of identification attributes only matches the second set of identification attributes on a non-unique identification attribute; and
determining that the asset record associated with the first set of identification attributes is a match for the second scan record in response to the first and second sets of identification attributes not having contradictory values on any identification attributes that have a higher authoritative weight than the non-unique identification attribute.

9. The method recited in claim 1, further comprising:
comparing the first set identification attributes to the second set identification attributes to identify one or more identification attributes that have different values; and
replacing existing values for the one or more identification attributes in the asset record with values contained in the second scan record in response to the second scan record having a more recent scan time than stored in the asset record.

10. The method recited in claim 1, further comprising:
comparing the first set identification attributes to the second set identification attributes to identify one or more identification attributes that have different values; and
keeping existing values for the one or more identification attributes in response to the second scan record having an older scan time than stored in the asset record.

11. The method recited in claim 1, further comprising:
comparing the first set identification attributes to the second set identification attributes to identify one or more identification attributes that have different values; and
appending values contained in the second scan record for the one or more identification attributes to existing values contained in the asset record in response to the unique electronic object likely having multiple network interface cards.

12. The method recited in claim 1, further comprising:
determining at least one identification attribute that does not have a value in the asset record and does have a value in the second scan record; and
adding the value for the at least one identification attribute to the asset record.

13. The method recited in claim 1, wherein matching the second scan record to the asset record corresponding to the unique electronic object associates the second scan record with vulnerability and configuration data linked to the asset record.

14. A method for elastic asset-centric vulnerability management, comprising:

receiving, at a vulnerability management system, a first scan record from one or more vulnerability scanners in communication with a managed network, wherein the first scan record comprises a first set of identification attributes that include at least a first Internet Protocol (IP) address;

searching existing asset records in an asset data store based on the first set of identification attributes contained in the first scan record;

creating, in the asset data store, an asset record to define a unique electronic object having the first set of identification attributes in response to the existing asset records in the asset data store not including a match for the first scan record;

receiving, at the vulnerability management system, a second scan record from the one or more vulnerability scanners, wherein the second scan record comprises a second set of identification attributes that include at least a second IP address;

matching the second scan record to the asset record corresponding to the unique electronic object having the first set of identification attributes based on the second set of identification attributes including at least one value that appears in the first set of identification attributes despite a mismatch between the first and second IP addresses; and updating, in response to the matching, the asset record based on the second scan record without generating a new asset record associated with the second scan record, wherein matching the second scan record to the asset record associated with the first set of identification attributes comprises determining that the first set of identification attributes matches the second set of identification attributes on an authoritative identification attribute.

15. A method for elastic asset-centric vulnerability management, comprising:

receiving, at a vulnerability management system, a first scan record from one or more vulnerability scanners in communication with a managed network, wherein the first scan record comprises a first set of identification attributes that include at least a first Internet Protocol (IP) address;

searching existing asset records in an asset data store based on the first set of identification attributes contained in the first scan record;

creating, in the asset data store, an asset record to define a unique electronic object having the first set of identification attributes in response to the existing asset records in the asset data store not including a match for the first scan record;

receiving, at the vulnerability management system, a second scan record from the one or more vulnerability scanners, wherein the second scan record comprises a second set of identification attributes that include at least a second IP address;

matching the second scan record to the asset record corresponding to the unique electronic object having the first set of identification attributes based on the second set of identification attributes including at least one value that appears in the first set of identification attributes despite a mismatch between the first and second IP addresses;

determining, based at least in part on the existing asset records in the asset data store, a total number of unique assets sighted in a current licensing period; and charging a customer that owns the managed network a software licensing fee based on the total number of unique assets sighted in the current licensing period.

16. The method recited in claim 15, further comprising counting the unique electronic object associated with the asset record among the total number of unique assets sighted in the current licensing period in response to determining that one or more of the first scan record or the second scan record includes information related to one or more vulnerabilities associated with the unique electronic object.

17. The method recited in claim 15, further comprising excluding the unique electronic object associated with the asset record among the total number of unique assets sighted in the current licensing period based on the first and second scan records both including information limited to discovery of the unique electronic object.

18. The method recited in claim 15, further comprising automatically reclaiming software licenses from one or more of the unique assets that have not been sighted within a predefined time period.

19. The method recited in claim 18, further comprising retaining vulnerability and configuration data associated with the one or more unique assets from which the software licenses are reclaimed.

20. The method recited in claim 15, further comprising:
observing a number of unique asset sightings that exceeds the total number of unique assets subject to the software licensing fee; and
permitting the observed number of unique asset sightings to temporarily exceed the total number of unique assets subject to the software licensing fee without requiring the customer to purchase additional software licenses.

21. The method recited in claim 20, further comprising charging the customer that owns the managed network a true-up fee based on the observed number of unique asset sightings in response to the observed number of unique asset sightings continuing to exceed the total number of unique assets subject to the software licensing fee for longer than a threshold duration of time.

22. A vulnerability management system, comprising:
one or more vulnerability scanners in communication with a managed network;
an asset data store comprising one or more storage devices configured to store existing asset records; and
one or more processor circuits configured to:
receive, from the one or more vulnerability scanners, a first scan record that comprises a first set of identification attributes that include at least a first Internet Protocol (IP) address;
search the existing asset records in the asset data store based on the first set of identification attributes contained in the first scan record;
create, in the asset data store, an asset record to define a unique electronic object having the first set of identification attributes in response to the existing asset records in the asset data store not including a match for the first scan record;
receive a second scan record from the one or more vulnerability scanners, wherein the second scan record comprises a second set of identification attributes that include at least a second IP address;
match the second scan record to the asset record corresponding to the unique electronic object having the first set of identification attributes based on the second set of identification attributes including at least one value that appears in the first set of identification attributes despite a mismatch between the first and second IP addresses; and update, in response to the matching, the asset record based on the second scan record without generating a new asset record associated with the second scan record, wherein the first and second sets of identification attributes each include one or more of multiple possible identification attributes that are ordered on a spectrum from authoritative to speculative.

23. The vulnerability management system recited in claim 22, wherein the one or more processor circuits are configured to search the existing asset records in the asset data store according to a descending priority of the multiple possible identification attributes from most authoritative to most speculative.

24. The vulnerability management system recited in claim 22, wherein each of the multiple possible identification attributes are ordered on the spectrum from authoritative to speculative based on an authoritative weight that depends on at least a uniqueness property that indicates a probability of different information technology assets sharing the same value for the respective identification attribute.

25. The vulnerability management system recited in claim 24, wherein the authoritative weight further depends on a multiples property that indicates a probability of one information technology asset having multiple valid values for the respective identification attribute.

26. The vulnerability management system recited in claim 22, wherein the multiple possible identification attributes include a universally unique identifier (UUID), a Media Access Control (MAC) address, a Network BIOS (NetBIOS) name, a Fully Qualified Domain Name (FQDN), and an IP address ordered from most authoritative to most speculative.

27. The vulnerability management system recited in claim 22, wherein the one or more processor circuits are further configured to remove one or more non-unique identification attributes from one or more of the first scan record or the second scan record prior to searching the existing asset records in the asset data store.

28. The vulnerability management system recited in claim 22, wherein the one or more processor circuits are further configured to:
identify at least one existing asset record that only matches the first set of identification attributes on a non-unique identification attribute; and
determine that the at least one existing asset record is not a match for the first scan record in response to the at least one existing asset record and the first set of identification attributes having different values on one or more identification attributes that have a higher authoritative weight than the non-unique identification attribute.

29. The vulnerability management system recited in claim 22, wherein the one or more processor circuits are further configured to:
determine that the first set of identification attributes only matches the second set of identification attributes on a non-unique identification attribute; and
determine that the asset record associated with the first set of identification attributes is a match for the second scan record in response to the first and second sets of identification attributes not having contradictory values on any identification attributes that have a higher authoritative weight than the non-unique identification attribute.

30. The vulnerability management system recited in claim 22, wherein the one or more processor circuits are further configured to:
compare the first set identification attributes to the second set identification attributes to identify one or more identification attributes that have different values; and
replace existing values for the one or more identification attributes in the asset record with values contained in the second scan record in response to the second scan record having a more recent scan time than stored in the asset record.

31. The vulnerability management system recited in claim 22, wherein the one or more processor circuits are further configured to:
compare the first set identification attributes to the second set identification attributes to identify one or more identification attributes that have different values; and
keep existing values for the one or more identification attributes in response to the second scan record having an older scan time than stored in the asset record.

32. The vulnerability management system recited in claim 22, wherein the one or more processor circuits are further configured to:
compare the first set identification attributes to the second set identification attributes to identify one or more identification attributes that have different values; and
append values contained in the second scan record for the one or more identification attributes to existing values contained in the asset record in response to the unique electronic object likely having multiple network interface cards.

33. The vulnerability management system recited in claim 22, wherein the one or more processor circuits are further configured to:
determine at least one identification attribute that does not have a value in the asset record and does have a value in the second scan record; and
add the value for the at least one identification attribute to the asset record.

34. The vulnerability management system recited in claim 22, wherein matching the second scan record to the asset record corresponding to the unique electronic object associates the second scan record with vulnerability and configuration data linked to the asset record.

35. A vulnerability management system, comprising:
one or more vulnerability scanners in communication with a managed network;
an asset data store comprising one or more storage devices configured to store existing asset records; and
one or more processor circuits configured to:
receive, from the one or more vulnerability scanners, a first scan record that comprises a first set of identification attributes that include at least a first Internet Protocol (IP) address;
search the existing asset records in the asset data store based on the first set of identification attributes contained in the first scan record;
create, in the asset data store, an asset record to define a unique electronic object having the first set of identification attributes in response to the existing asset records in the asset data store not including a match for the first scan record;
receive a second scan record from the one or more vulnerability scanners, wherein the second scan record comprises a second set of identification attributes that include at least a second IP address;

match the second scan record to the asset record corresponding to the unique electronic object having the first set of identification attributes based on the second set of identification attributes including at least one value that appears in the first set of identification attributes despite a mismatch between the first and second IP addresses; and update, in response to the matching, the asset record based on the second scan record without generating a new asset record associated with the second scan record, wherein the second scan record is matched to the asset record associated with the first set of identification attributes based on the first set of identification attributes matching the second set of identification attributes on an authoritative identification attribute.

36. A vulnerability management system, comprising:

one or more vulnerability scanners in communication with a managed network;

an asset data store comprising one or more storage devices configured to store existing asset records; and one or more processor circuits configured to:
receive, from the one or more vulnerability scanners, a first scan record that comprises a first set of identification attributes that include at least a first Internet Protocol (IP) address;

search the existing asset records in the asset data store based on the first set of identification attributes contained in the first scan record;

create, in the asset data store, an asset record to define a unique electronic object having the first set of identification attributes in response to the existing asset records in the asset data store not including a match for the first scan record;

receive a second scan record from the one or more vulnerability scanners, wherein the second scan record comprises a second set of identification attributes that include at least a second IP address;

match the second scan record to the asset record corresponding to the unique electronic object having the first set of identification attributes based on the second set of identification attributes including at least one value that appears in the first set of identification attributes despite a mismatch between the first and second IP addresses;

determine, based at least in part on the existing asset records in the asset data store, a total number of unique assets sighted in a current licensing period; and charge a customer that owns the managed network a software licensing fee based on the total number of unique assets sighted in the current licensing period.

37. The vulnerability management system recited in claim 36, wherein the one or more processor circuits are further configured to count the unique electronic object associated with the asset record among the total number of unique assets sighted in the current licensing period in response to one or more of the first scan record or the second scan record including information related to one or more vulnerabilities associated with the unique electronic object.

38. The vulnerability management system recited in claim 36, wherein the one or more processor circuits are further configured to exclude the unique electronic object associated with the asset record among the total number of unique assets sighted in the current licensing period based on the first and second scan records both including information limited to discovery of the unique electronic object.

39. The vulnerability management system recited in claim 36, wherein the one or more processors are further configured to automatically reclaim software licenses from one or more of the unique assets that have not been sighted within a predefined time period.

40. The vulnerability management system recited in claim 39, wherein the one or more processor circuits are further configured to retain vulnerability and configuration data associated with the one or more unique assets from which the software licenses are reclaimed.

41. The vulnerability management system recited in claim 36, wherein the one or more processor circuits are further configured to:
observe a number of unique asset sightings that exceeds the total number of unique assets subject to the software licensing fee; and permit the observed number of unique asset sightings to temporarily exceed the total number of unique assets subject to the software licensing fee without requiring the customer to purchase additional software licenses.

42. The vulnerability management system recited in claim 41, wherein the one or more processor circuits are further configured to charge the customer that owns the managed network a true-up fee based on the observed number of unique asset sightings in response to the observed number of unique asset sightings continuing to exceed the total number of unique assets subject to the software licensing fee for longer than a threshold duration of time.

* * * * *